United States Patent [19]
Ichikawa et al.

[11] Patent Number: 5,291,192
[45] Date of Patent: Mar. 1, 1994

[54] PAGING SYSTEM AND ITS OPERATING METHOD WITH REPEATED TRANSMISSION

[75] Inventors: Yoshio Ichikawa; Derek Dawkins, both of Tokyo, Japan

[73] Assignee: NEC Corporation, Japan

[21] Appl. No.: 823,285

[22] Filed: Jan. 21, 1992

[30] Foreign Application Priority Data

Jan. 24, 1991 [JP] Japan .................................. 3-023964

[51] Int. Cl.$^5$ ............................................. H04Q 7/02
[52] U.S. Cl. .............................. 340/825.44; 340/311.1
[58] Field of Search ........... 340/311.1, 825.44, 825.47, 340/825.48; 370/94.1; 455/31.1, 32.1, 38.1, 38.2, 38.3, 38.4; 379/56, 57

[56] References Cited

U.S. PATENT DOCUMENTS

| | | | |
|---|---|---|---|
| 4,823,123 | 4/1989 | Siwiak | 340/311.1 |
| 4,897,835 | 1/1990 | Gaskill et al. | 370/94.1 |
| 5,049,874 | 9/1991 | Ishida et al. | 340/311.1 |
| 5,159,331 | 10/1992 | Park et al. | 340/825.44 |

FOREIGN PATENT DOCUMENTS

| | | | |
|---|---|---|---|
| 0206862 | 12/1988 | Japan . | |
| 8604476 | 7/1986 | World Int. Prop. O. | 340/825.44 |

Primary Examiner—Donald J. Yusko
Assistant Examiner—J. Giust
Attorney, Agent, or Firm—Laff, Whitesel, Conte & Saret

[57] ABSTRACT

This improved paging system not only detects an omission of a message reception, but also acquires an unreceived message. When a normal paging request call is made from a public telephone network, the paging control unit adds to the received request a message counter including the called subscriber's number and then transmits an encoded paging signal which includes the received request. Further, a control unit stores the message data in a storage unit corresponding to a value of the counter of the called subscriber's number. The called pager detects an omission of a message reception through the received message counter value by comparing it with the message counter value of the last received message signal. A displayed message indicates an omission as well as the value of the omitted message. Thus, a call can be made through a public telephone network to request a repeated transmission. When the message counter value is specified, the paging control unit retrieves the message data stored in the message data storage unit corresponding to the specified value and transmits the data from the transmitter.

2 Claims, 5 Drawing Sheets

PAGING SYSTEM AND ITS OPERATING METHOD WITH REPEATED TRANSMISSION

BACKGROUND OF THE INVENTION

1. Field of the Invention

The present invention relates generally to a paging system and its operating method, and more particularly to a paging system with a message display unit.

2. Description of the Related Art

There has recently been a marked development in the field of mobile radio communications service, and paging systems is one of the representative areas of this field. Paging systems provide the simple service of transmitting messages only one way, and the number of subscribers per radio wave is by far greater than for other systems (e.g., automobile telephone systems). As a result, their subscription fees are low and their use has spread rapidly. However, pager systems have recently been improved so as to operate not only the calling service but also to display messages on the pager.

A paging system with a message display service comprises at least a paging control unit connected to a public telephone network, a transmitter connected to the paging control unit and a plurality of pagers for receiving the paging signal transmitted from the transmitter. When a paging request call originates through a public telephone network, the paging control unit accepts the incoming call along with the subscriber's number and message data, converts the incoming call into a paging signal including the address code of the pager and a message signal referring to a subscriber file, which retains the corresponding relation between the subscriber's number and an address code for the pager, and transfers the converted paging signal to the transmitter. The transmitter transmits the paging signal in the form of radio waves. On the other hand, each pager is provided with a receiving circuit tuned for its specific address code selectively, a control unit to store a succeeding message signal in a storage unit, and a display means to display the message on a display unit (prior art document, Japanese Patent No. 64097/1988, discloses the constitution of a pager with a display function).

Although such a paging system is quite effective, it is still somewhat inconvenient because it only affords one-way service. Pager carriers often worry that some messages might not be received. Paging systems used with message-displaying pagers have the advantage that a plurality of callers may send messages incorporating the callers, names so as to distinguish who sent the messages, but the receiving parties tend to worry about the possibility that some messages may remain unreceived without any way to check for them.

SUMMARY OF THE INVENTION

In view of the foregoing problems of the prior art, an object of the present invention is to eliminate the worry of pager users that some messages might by chance not be received.

Another object of the present invention is to provide more reliable service that can display any unreceived messages.

In order to achieve the above objects, the present invention comprises a method of operating a paging system comprising steps at its paging control unit to convert an incoming call received through the public telephone network which includes a subscriber's number and message data into a paging signal which includes an address code and a message signal. Then the paging signal is transmitted. Each pager having a message display function receives its address code selectively, and stores the message signal in a storage unit and display the message on a display unit. The operation at the paging control unit further comprises steps of storing a renewed value for the number of calls for each subscriber's number and transfers the renewed value of the serial number to the transmitter together with the message signal. The operation at each pager further comprises steps to store the received value of the serial number of called times included in the paging signal for each reception and compares the value with that of the last message signal so as to alert the user when the difference between the above values is two or more.

According to the present invention, another method of achieving the above objects includes an operation at the paging control unit comprising further steps to store the message data in addition to the serial number of the number of calls for each subscriber's number, to judge whether an incoming paging request call through a public telephone network is a normal paging request call or a call requesting a repeat transmission and to transfer the requested paging signal including the value of the serial number for the number of calls and its message data to the transmitter when the call is judged to be a call requesting a repeat transmission.

In order to accomplish the first object, the paging system according to the present invention comprises a paging control unit for converting an incoming paging request call received though a public telephone network. The paging request call includes the subscriber's number and message data. The paging request is converted into a paging signal consisting of an address code and message signal. A transmitter transmits the paging signal. A plurality of pagers incorporates message displays. Each pager has means for receiving the address code selectively. A control unit in the pagers stores the message data in its storage unit. A display unit displays the message data on a display. The paging control unit further provides message counters for each subscriber's number, counting means to count the message counter value for each called subscriber's number corresponding to each incoming paging request call, and means to generate a paging signal which includes the message counter value in the message signal corresponding to the subscriber's number called for transfer to the transmitter. Each pager provides a judging means to judge whether the message reception is in order by comparing the received message counter value with that of the last message signal. A display means displays a message indicating the omission of message reception when a message is judged to have been omitted.

In order to accomplish the second object, the paging control unit in the inventive paging system further comprises a judging means to judge whether an incoming call is a normal paging request call or a call requesting a repeat transmission. A message data storage means stores message data included in the incoming normal paging request call in a message data storage unit of the called subscriber's number in accordance with the message counter value. A paging signal is generated to include the given message counter value and the message data stored in the message data unit in accordance with the given message counter value in the incoming call for transfer to the transmitter for each call requesting repeat transmission.

BRIEF DESCRIPTION OF THE DRAWINGS

These and other objects of the present invention will become apparent from the following description in conjunction with the accompanying drawings, in which:

FIG. 3(a) is an address signal format, and FIGS. 3(b), (c) are examples of message signal formats;

DESCRIPTION OF THE PREFERRED EMBODIMENT

Referring to the accompanying drawings, a detailed description will now be given of an embodiment of the present invention.

Figure 1:
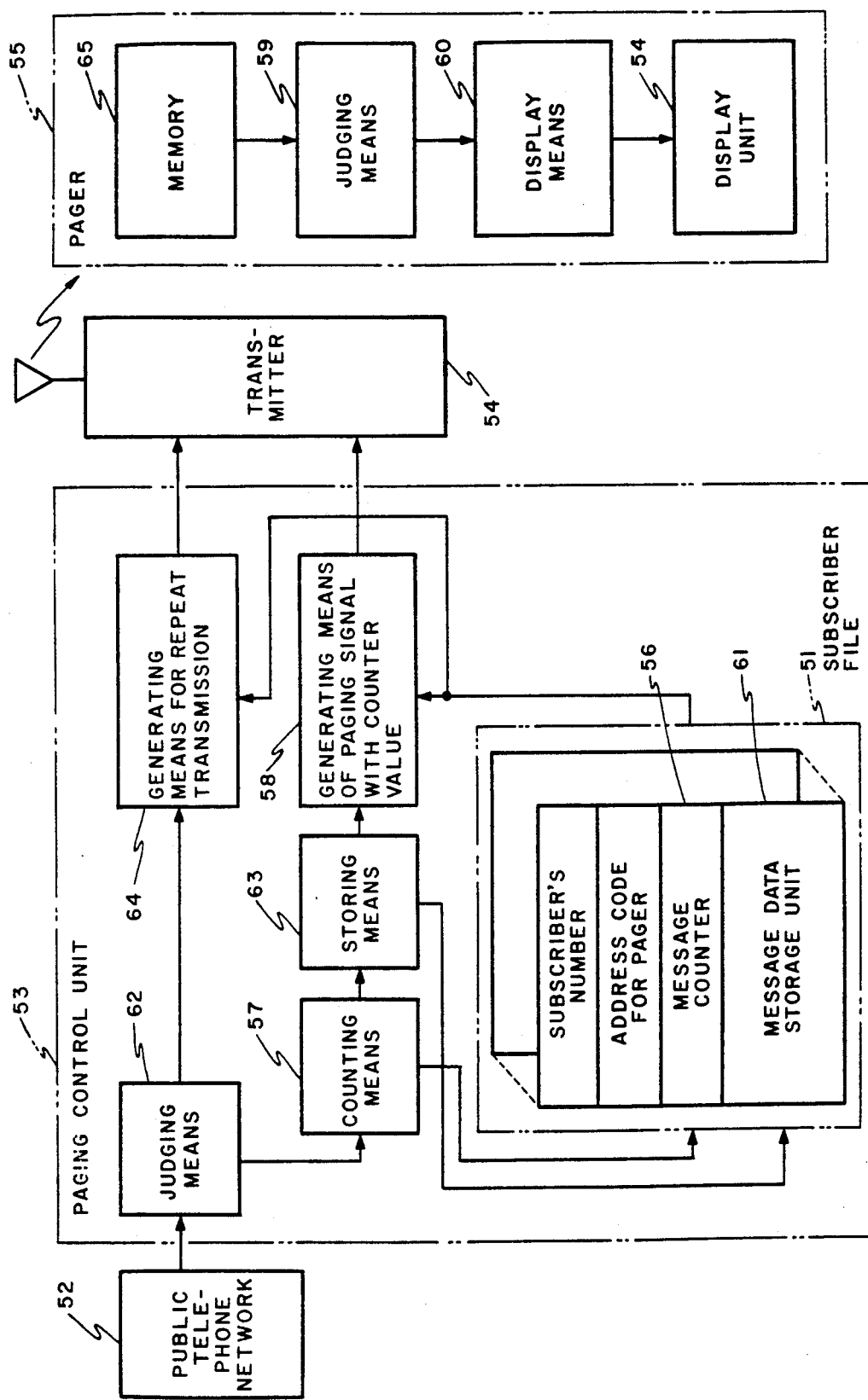
FIG. 1 is a block diagram illustrating the general structure of the paging system of the present invention.

A paging system according to the invention generally comprises, as shown in the FIG. 1, a paging control unit 53 which converts a subscriber's number and message data included in an incoming paging request call into a paging signal which includes the corresponding address code and message signal referring to built-in subscriber file 51 which shows the relation between the subscriber's number and address code of each pager, a transmitter 54 to transmit the paging signal, and a plurality of pagers having a message-display function, each of which receives its own address code selectively, stores the message data in its storage unit 65, and displays the message data on its display unit 54, the paging control unit 53 further comprising message counters 56 for each subscriber, a counting means 57 to add "1" to the message counter value for each call to a respective subscriber and a paging signal generating means 58 to generate a paging signal which includes the renewed message counter value to transfer to the transmitter 54, and each pager 55 further comprises a judging means 59 to detect the omission of a reception by comparing the message counter value with that of the last message signal and a display means 60 to display a message indicating the omission of reception and its message counter value when a missed reception is detected. In order to pick up an omitted message, the paging system comprises in the paging control unit 53 a judging means 62 to judge whether an incoming call is a normal paging request call or a call requesting a repeat transmission, storing means 63 to store message data of incoming calls in the message data storage unit 61 corresponding to the value of message counter 56 and generating means 64 to send a paging signal which includes the requested message counter value and corresponding message data from the message data storage unit for the request of repeat transmission.

Figure 2:
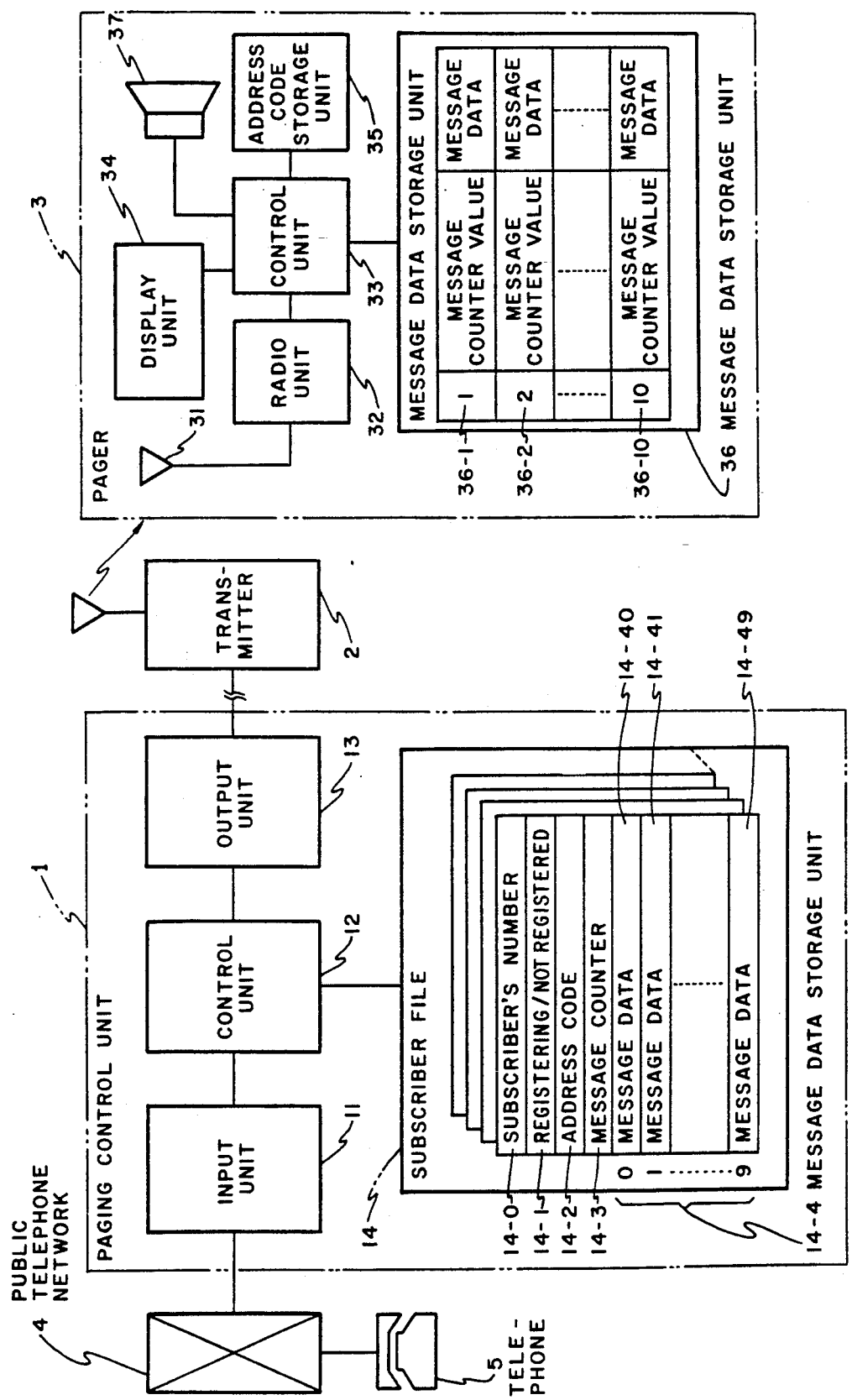
FIG. 2 is a functional block diagram illustrating a paging system as an embodiment of the present invention.

FIG. 2 is a block diagram illustrating a first embodiment of a paging system to which a method of operation according to the present invention is applied.

As shown in FIG. 2, a paging control unit 1 is connected to a public telephone network 4 and accepts a paging request call from a telephone 5. The paging control unit 1 includes an input unit 11 for controlling the connection with the public telephone network 4, a control unit 12 for controlling the whole system, an output unit 13 for producing a paging signal and connecting the paging signal to a transmitter 2 and a subscriber file 14. The subscriber file 14 stores all data that is required for each subscriber in the paging control unit. For example, the subscriber number 14 - 0; a mark indicating registered/not registered 14 - 1, an address code 14 - 2 corresponding to the subscriber's number and a message counter 14 - 3 are each stored in respective areas, and a message data storage unit 14 - 4 is used to store a plurality of message data. In this case, the message counter 14 - 3 counts 0 up to 9 and returns to 0, whereas the message data storage unit 14 - 4 has storage areas 14 - 40 to 14 - 49 for a maximum number of 10, each of which corresponds to the value of the message counter 14 - 3. The transmitter 2 is used for transmitting paging signals transferred from the paging control unit 1 to a plurality of pagers 3 for receiving the paging signal transmitted from the transmitter. Each pager 3 comprises an antenna 31, a radio unit 32, a control unit 33, a message display unit 34, an address code storage unit 35, a message storage unit 36 having a plurality of storage areas 36 - 1 to 36 - 10 for storing a plurality of message data corresponding to the message counter value 0 to 9 and an "alert" generator 37.

Figure 3A:
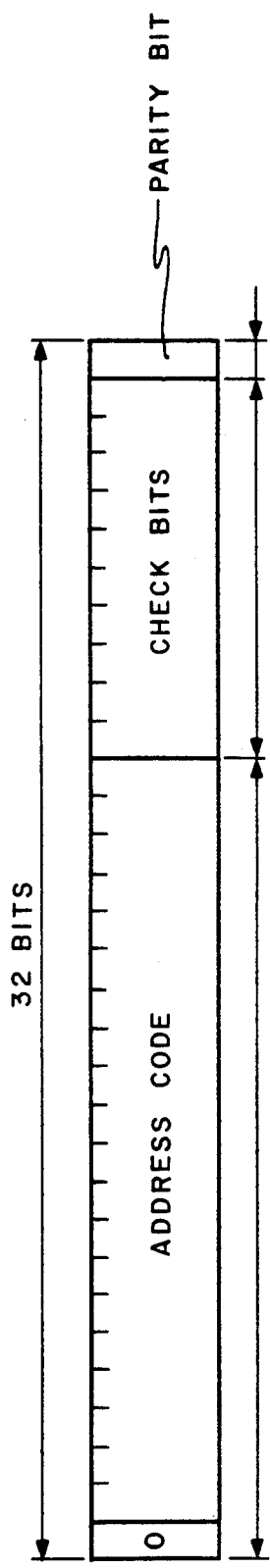
FIGS. 3a-3c are diagrams illustrating specific signal formats of paging signals by way of example, where.
Figure 3B:
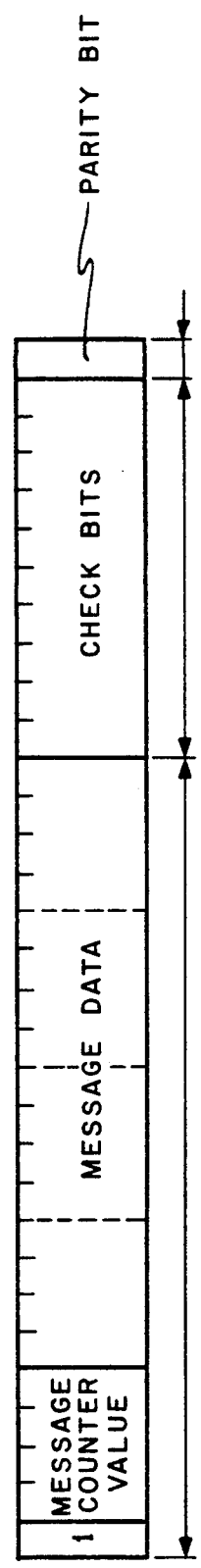
Figure 3C:
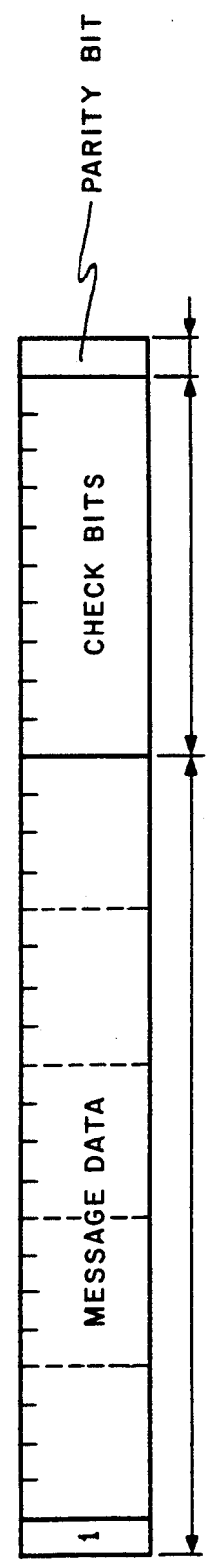

A POCSAG signal is commonly used as the paging signal (see CCIR Recommendation No. 584) and is also employed in this embodiment. With respect to the message, 4-bit rule numeric data is employed and the first digit of a message signal (MSD) is used for the message counter value. FIG. 3 shows an example of specific signal formats: FIG. 3(a) shows an address signal format, and FIGS. 3(b) and 3(c) show message signal formats. FIG. 3(b) shows an example of a message signal format which includes the message counter value at the first digit and message data in the remaining digits, whereas FIG. 3(c) shows an example of a message signal format for use successively when the message signal in the format of FIG. 3(b) is insufficient.

Figure 4:
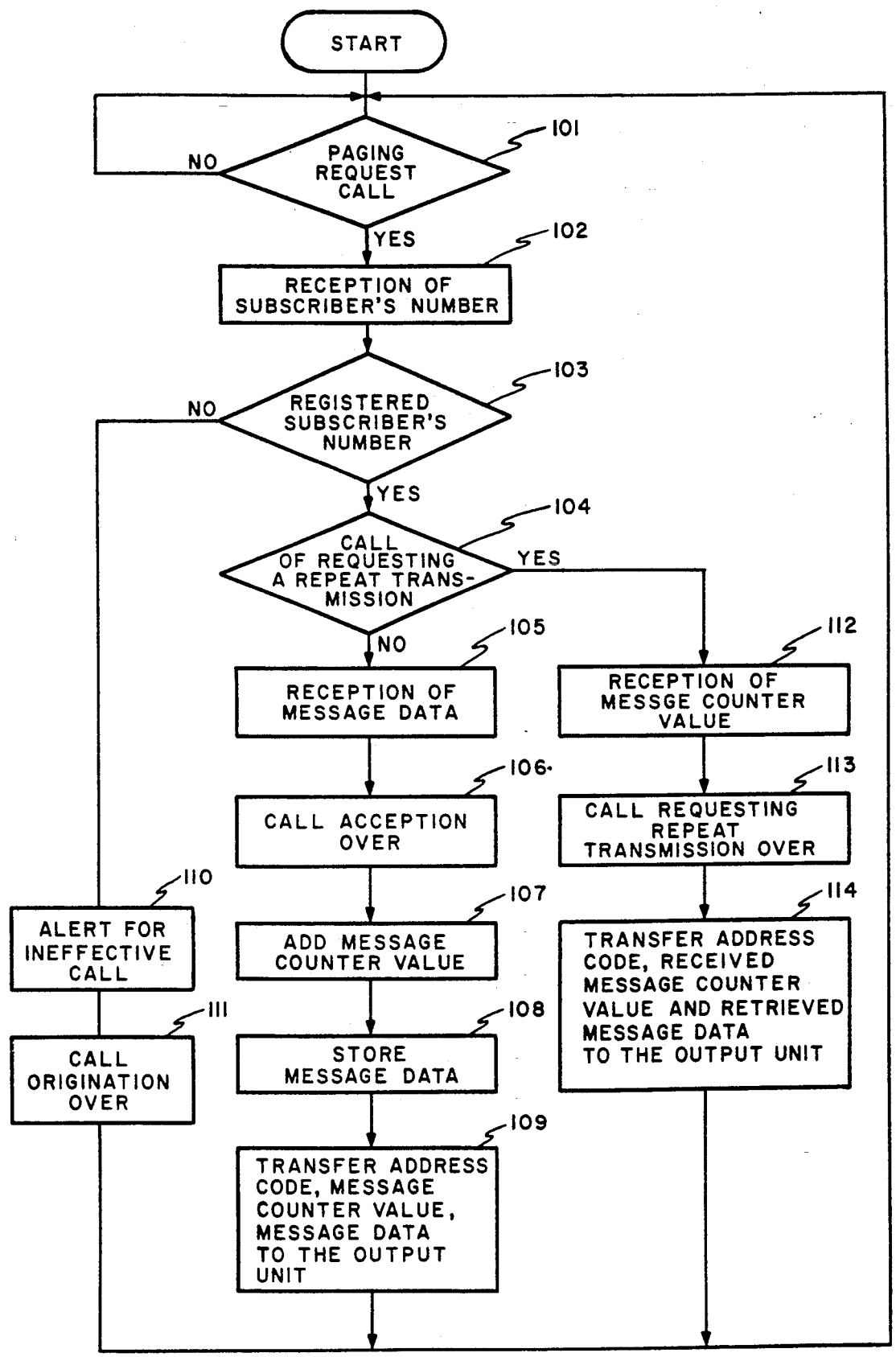
FIG. 4 is a flowchart showing the operation of paging control unit 1.
Figure 5:
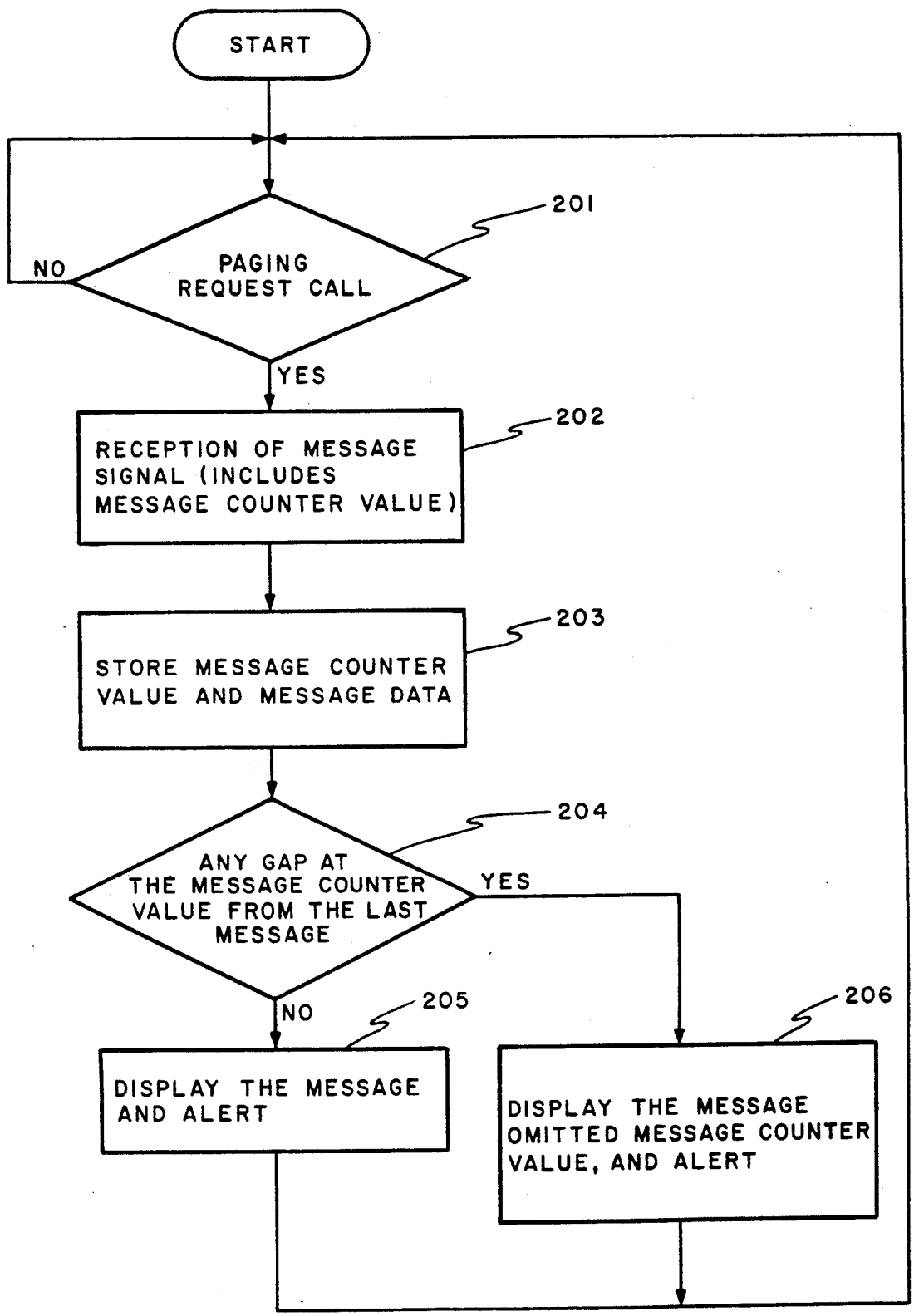
FIG. 5 is a flowchart showing the operation of pager 3.

FIG. 4 is a flowchart showing the operation of the paging control unit 1 and FIG. 5 is a flowchart showing the operation of the pager. The operation of the embodiment will now be described with reference to each drawing.

The paging control unit 1 has an input unit 11 to respond to incoming calls from any telephone (step 101), and when a call is received, the paging control unit starts the process of accepting a subscriber's number (step 102). When the connection with the public telephone network 4 is a direct trunk line, a multi-frequency signaling can be used for sending the subscriber's number. Upon reception of the subscriber's number by the input unit 11, the control unit 12 collates it with the subscriber file (step 103). If the subscriber's number is not registered (step 103), the control unit 12 causes the generation an ineffective tone in order to inform the caller that the call is an ineffective call (step 110) and then terminates the call operation (step 111). When the subscriber's number is verified as being registered (step 103), the control unit further checks whether the call is a call requesting a repeat transmission (step 104).

A call requesting repeat transmission is a call from a pager carrier who wants to pick up an unreceived message by the repeat transmission. In this embodiment, a dual tone multi-frequency (DTMF) signal from a pushbutton telephone is used to make calls requesting repeat transmission by dialing a predetermined code, for example "#\*." Consequently, a caller is allowed to send numeric data directly to make a normal paging request call. Moreover, dialing a prearranged code, for example "##", will terminate the dialing of message data.

Assuming a caller makes a normal paging request call (the operation for a call requesting repeat transmission will be described later), the control unit 12 receives the message (step 105) and deems the reception is over when it receives the signal "##" (step 106). At the time the call is completed, the control unit 12 adds "1" to the message counter 14 - 3 corresponding to the called subscriber's number (step 107) and records the received message data in the storage area 14 - 4i corresponding to the value (i) of the message counter 14 - 3 in the message data storage unit 14 - 4 of the called subscriber's number (step 108). The control unit 12 further sends the address code 14 - 2 registered at the subscriber's number file, the value of the message counter 14 - 3 and the received message data in the storage area 14 - 4i to the output unit 13 (step 109).

The output unit 13 transfers the data received from the control unit 12 as a paging signal to the transmitter 2, after encoding the address code for the format of FIG. 3(a) and the message counter value and the message data for the formats of FIG. 3(b), 3(c). The transmitter 2 transmits the paging signal in the form of radio wave.

The pager 3 receives the paging signal via the antenna 31 and the radio unit 32, and causes the control unit 33 to check whether the address code conforms to its own address code stored in the storage unit 35, that is, to detect whether the pager has been called (step 201). When the pager is called, the control unit 33 starts to receive the message signal following the address code (step 202) and stores the received data in the storage area 36 - 1 in the message data storage unit 36 as a message counter value and message data (step 203). In this case, as message counter value and message data have been stored in the message data storage unit 36 in the serial order of reception, the control unit 33 compares the message counter value received this time with that of the last message signal in order to check whether there is a gap in the message counter values (step 204). Incidentally, "0" is processed as a continuous number which follows "9" in the assignment of message counter values. When no gap is found between the message counter values, the message data received this time is displayed in the message display unit 34 and the "alert" generator 37 is caused to send an "alert" signal indicating reception of a call (step 205). If, however, there is a gap in the message counter values, the message display unit 34 is caused to generate a specific alert (step 206) and display a message to indicate the presence of an unreceived message along with the omitted message counter value in addition to the message data received this time. With this operation, the pager carrier is informed of the presence of an unreceived message as well as the message counter value.

One method for storing the most recent message data at the top position of the storage area 36 - 1 is to transfer each message toward storage area having older storage area numbers successively one by one at each reception and erase the message in the storage area 36 - 10 at the following reception. Another method is to provide registers R1 to R10 for holding addresses of storage areas 36 - 1 to 36 - 10, respectively, and to shift the contents of the register from R1 to R2, R2 to R3, ..., R9 to R10, at each reception, so that the most recent message is always stored in a storage area 36 - i designated by the contents i of the register R1. At the same time, the message in the storage area 36 - j designated by the contents j of the register R10 is successively erased.

A description will now be given of the operation of picking up an unreceived message, that is, the operation for a call requesting repeat transmission.

On confirming the presence of an unreceived message, a pager carrier dials his own subscriber's number through any telephone as in the case of a normal call. The paging control unit 1 performs processes up to Step 104 as for a normal paging request call. The pager carrier dials "#\*" from the push-button telephone to signal a request for repeat transmission, and the control unit 12 of the paging control unit 1 judges the call to be a call requesting repeat transmission (step 104) and anticipates the reception of one digit representing the message counter value of the missed call instead of message data (step 112). When the pager carrier accordingly dials the message counter value of the unreceived message displayed on the pager 3 through the push-button telephone, the paging control unit 1 receives it and the control unit 12 regards the acceptance of the message counter value as the termination of the call requesting repeat transmission (step 113) and sends to the output unit 13 the address code 14 - 2 registered at the called subscriber's file, the message counter value, and the message data stored in the storage unit 14 - 4 (Step 114).

The output unit 13 transfers the data received from the control unit 12 as a paging signal to the transmitter 2 by encoding the address code for the format of FIG. 3(a), the message counter value, and the message data as a message signal for the formats of FIG. 3(b), 3(c). The transmitter 2 transmits the paging signal in the form of radio wave. As a result, the unreceived message is displayed on the message display unit 34 of the pager of the pager carrier who has made the call requesting repeat transmission. In other words, the operation of the pager 3 proceeds as normal from step 204 to step 206 in FIG. 5 and the unreceived message is displayed at step 206. Although a message indicating omission is also displayed on the same image of display, the pager carrier can determine that the displayed message is the one he requested.

While the invention has been described with reference to a preferred embodiment, the scope of the invention is not limited to the particular form set forth, but, on the contrary, can include such alternatives, modifications, and equivalents as may be included within the spirit and scope of the invention as defined in the appended claims.

What is claimed is:

1. A method of operating a paging system, which is composed of a paging control unit, a transmitter and a plurality of pagers, each having a storage unit, said method comprising the steps:

at said paging control unit:
converting and storing an incoming call requesting a paging service into a converted paging signal, said call being received through a public telephone network, said call requesting said paging service including a called subscriber's number and message data, said paging signal including an address code of a called subscriber's pager and a message signal in order to transmit said converted paging signal;
giving each incoming call requesting said paging service a message counter value which is individually associated with each subscriber; and transferring said paging signal including its message signal to said transmitter; and at each pager having a message display function:

storing said message signal including said message counter value in its storage unit, at said paging control unit the further steps of:

determining whether an incoming call received through a public telephone network is a normal call requesting paging service or a call from a suer of a pager who is requesting a repeated transmission, and transferring the retrieved paging signal with caller's address code, requested message counter value, and its message data to the transmitter when said incoming call is determined to be a call requesting a repeated transmission.

2. A paging system comprising a paging control unit for converting an incoming call requesting a paging service which is received from a public telephone network, said paging request call including a called subscriber's number and message data, said control unit converting and storing said paging request call received through said public telephone network into a paging signal having address code of called subscriber's pager and a message signal, transmitter means for transmitting the paging signal; a plurality of pagers each having a message display; means at each pager for selectively receiving an address code; a control unit for storing said message data in its storage unit, said paging control unit further having counting means for giving each incoming paging request call a message counter value for each subscriber, a message data storage unit, storage means within said message data storage unit for storing received message data including said message counter value to a zone assigned to each called subscriber, and means for generating a paging signal which includes said message counter value in said message signal for transfer to said transmitter, said paging control unit further comprising:

determining means for judging whether an incoming call is a normal paging request call or a call requesting a repeated transmission of a previous paging signal, means for regenerating a paging signal which includes said designated message counter value and said message data stored in said message data storage unit in response to an incoming call requesting a repeated transmission and designating said message counter value, and said pager further comprising:

determining means for determining whether said message reception is in order by comparing said message counter value of said received message signal with the message counter value of the last message signal, and display means for displaying a message indicating an omission of a message reception with its message counter value when a message is determined to have been omitted.

* * * * *